US012581478B2

(12) United States Patent
Lee et al.

(10) Patent No.: US 12,581,478 B2
(45) Date of Patent: Mar. 17, 2026

(54) GROUP-BASED RADIO RESOURCE ALLOCATION BETWEEN A TN AND AN NTN NETWORKS

(71) Applicants: MEDIATEK INC., Hsinchu (TW); National Taiwan University, Taipei (TW)

(72) Inventors: Hao-Wei Lee, Hsinchu (TW); I-Kang Fu, Hsinchu (TW); Chun-Chia Chen, Hsinchu (TW); Chen-I Liao, Hsinchu (TW); Hung-Yu Wei, Taipei City (TW)

(73) Assignees: MEDIATEK INC., Hsinchu (TW); NATIONAL TAIWAN UNIVERSITY, Taipei (TW)

( * ) Notice: Subject to any disclaimer, the term of this patent is extended or adjusted under 35 U.S.C. 154(b) by 412 days.

(21) Appl. No.: 18/356,106

(22) Filed: Jul. 20, 2023

(65) Prior Publication Data

US 2024/0049212 A1 Feb. 8, 2024

Related U.S. Application Data

(60) Provisional application No. 63/370,132, filed on Aug. 2, 2022.

(51) Int. Cl.
*H04W 72/121* (2023.01)
*H04B 7/185* (2006.01)

(52) U.S. Cl.
CPC ...... *H04W 72/121* (2013.01); *H04B 7/18513* (2013.01)

(58) Field of Classification Search
CPC .............. H04W 72/121; H04W 72/12; H04W 72/1263; H04W 72/50; H04W 72/51; H04W 72/53; H04W 72/563; H04W 72/56; H04B 7/18513; H04B 7/185; H04B 7/18519; H04B 7/18523; H04B 7/18528; H04B 7/18539
See application file for complete search history.

(56) References Cited

U.S. PATENT DOCUMENTS

2024/0080836 A1* 3/2024 Agrawal ........... H04W 72/1268

* cited by examiner

*Primary Examiner* — Keith Ferguson
(74) *Attorney, Agent, or Firm* — McClure, Qualey & Rodack, LLP

(57) ABSTRACT

A method for performing radio resource allocation in a TN-NTN mixed system is provided. The system includes a satellite that covers an NTN cell, and a plurality of TN base stations (TN BSs) within a coverage of the satellite. The NTN cell serves a plurality of NTN user equipments (NTN UEs). The method includes dividing the plurality of NTN UEs into X NTN UE groups; partitioning a radio resource into M parts, where M≥X; dividing the plurality of TN BSs into M TN BS groups; deciding radio resource allocation regarding the plurality of NTN UEs, by allocating an i-th part of the radio resource to an i-th NTN UE group, where i=1, 2, . . . , X; and deciding radio resource allocation regarding the plurality of TN BSs, by allocating a sum of a j-th to an M-th parts of the radio resource to a j-th TN BS group, where j=1, 2, . . . , M.

20 Claims, 10 Drawing Sheets

NTN TRAFFIC LOAD/BW    TN TRAFFIC LOAD/BW

URBAN

RURAL

SUBURBAN

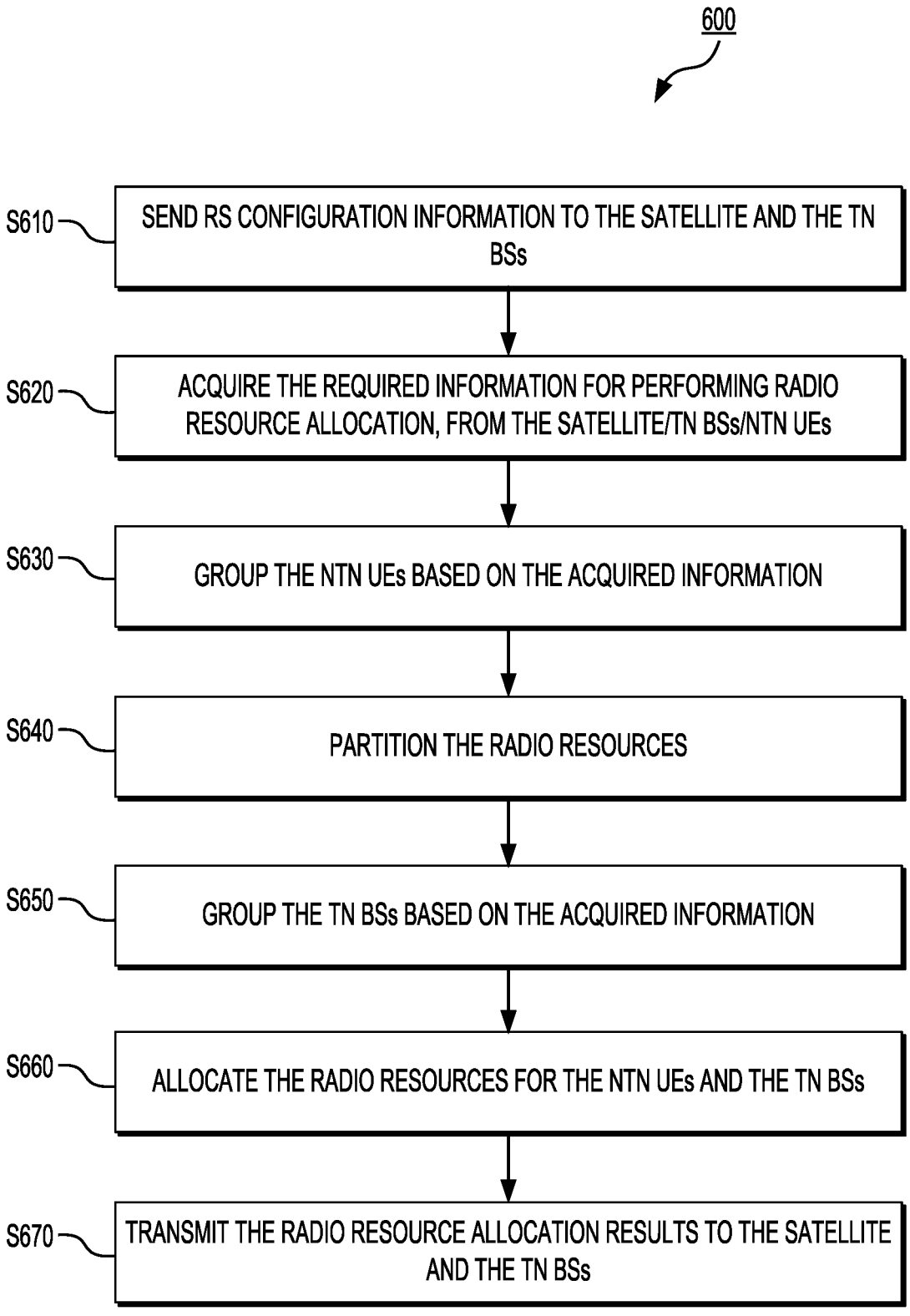

600

S610 — SEND RS CONFIGURATION INFORMATION TO THE SATELLITE AND THE TN BSs

S620 — ACQUIRE THE REQUIRED INFORMATION FOR PERFORMING RADIO RESOURCE ALLOCATION, FROM THE SATELLITE/TN BSs/NTN UEs

S630 — GROUP THE NTN UEs BASED ON THE ACQUIRED INFORMATION

S640 — PARTITION THE RADIO RESOURCES

S650 — GROUP THE TN BSs BASED ON THE ACQUIRED INFORMATION

S660 — ALLOCATE THE RADIO RESOURCES FOR THE NTN UEs AND THE TN BSs

S670 — TRANSMIT THE RADIO RESOURCE ALLOCATION RESULTS TO THE SATELLITE AND THE TN BSs

*FIG. 6*

GROUP-BASED RADIO RESOURCE ALLOCATION BETWEEN A TN AND AN NTN NETWORKS

CROSS REFERENCE TO RELATED APPLICATIONS

The present application claims priority to U.S. Provisional Application No. 63/370,132, entitled "A method of group-based radio resource allocation between a TN and an NTN networks," filed on Aug. 2, 2022. The U.S. Provisional Application is incorporated herein by reference in its entirety.

TECHNICAL FIELD

The present disclosure relates generally to mobile communication networks. In particular, the disclosure relates to coordinated allocation of radio resources between terrestrial and non-terrestrial networks (TN; NTN).

BACKGROUND

Coverage extension and capacity enhancement are two primary challenges in the field of mobile networks. It has been observed that there exists a complementary demand for both terrestrial network (TN) spectrum and non-terrestrial network (NTN) spectrum across different geographic locations. On one hand, in densely populated areas, there is a significant need for TN spectrum, while NTN spectrum remains underutilized. On the other hand, in remote areas, there is no TN coverage, resulting in unused TN spectrum, and a severe shortage of NTN spectrum.

In order to address this complementary demand, it is desirable to leverage the currently unused spectrum to augment system capacity and spectral efficiency, so as to provide global service for multimode devices through coordination between TN and NTN.

SUMMARY

Aspects of the disclosure provide a method for performing radio resource allocation in a terrestrial network (TN) and non-terrestrial network (NTN) mixed system. The mixed system includes a satellite that covers at least one NTN cell, and a plurality of TN base stations (TN BSs) within a coverage of the satellite. The NTN cell serves a plurality of NTN user equipments (NTN UEs). Each of the plurality of TN BSs serves a plurality of TN user equipments (TN UEs). The method includes: dividing the plurality of NTN UEs into X NTN UE groups; partitioning a radio resource into M parts, where M>X; dividing the plurality of TN BSs into M TN BS groups; deciding radio resource allocation regarding the plurality of NTN UEs, by allocating an i-th part of the radio resource to an i-th NTN UE group, where i=1, 2, . . . , X; and deciding radio resource allocation regarding the plurality of TN BSs, by allocating a sum of a j-th to an M-th parts of the radio resource to a j-th TN BS group, where j=1, 2, . . . , M.

Aspects of the disclosure provide an apparatus for performing radio resource allocation in a terrestrial network (TN) and non-terrestrial network (NTN) mixed system. The mixed system includes a satellite that covers at least one NTN cell, and a plurality of TN base stations (TN BSs) within a coverage of the satellite. The NTN cell serves a plurality of NTN user equipments (NTN UEs). Each of the plurality of TN BSs serves a plurality of TN user equipments (TN UEs). The apparatus includes circuitry configured to: divide the plurality of NTN UEs into X NTN UE groups; partition a radio resource into M parts, where M>X; divide the plurality of TN BSs into M TN BS groups; decide radio resource allocation regarding the plurality of NTN UEs, by allocating an i-th part of the radio resource to an i-th NTN UE group, where i=1, 2, . . . , X; and decide radio resource allocation regarding the plurality of TN BSs, by allocating a sum of a j-th to an M-th parts of the radio resource to a j-th TN BS group, where j=1, 2, . . . , M.

Aspects of the disclosure also provide a non-transitory computer-readable medium storing instructions. The instructions, when executed by a processor, can cause the processor to perform the above method for performing radio resource allocation in a TN-NTN mixed system.

Note that this summary section does not specify every embodiment and/or incrementally novel aspect of the present disclosure or claimed invention. Instead, the summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein:

FIG. 6 shows a flow chart of a process for performing the coordinated allocation of radio resources between NTN UEs and TN BSs, in accordance with embodiments of the disclosure;

DETAILED DESCRIPTION OF EMBODIMENTS

The following disclosure provides many different embodiments, or examples, for implementing different features of the provided subject matter. Specific examples of components and arrangements are described below to simplify the present disclosure. These are, of course, merely examples and are not intended to be limiting.

For example, the order of discussion of the different steps as described herein has been presented for the sake of clarity. In general, these steps can be performed in any suitable order. Additionally, although each of the different features, techniques, and configurations, etc., herein may be discussed in different places of this disclosure, it is intended that each of the concepts can be executed independently of each other or in combination with each other. Accordingly, the present disclosure can be embodied and viewed in many different ways.

Furthermore, as used herein, the words "a," "an," and the like generally carry a meaning of "one or more," unless stated otherwise.

Figure 1:
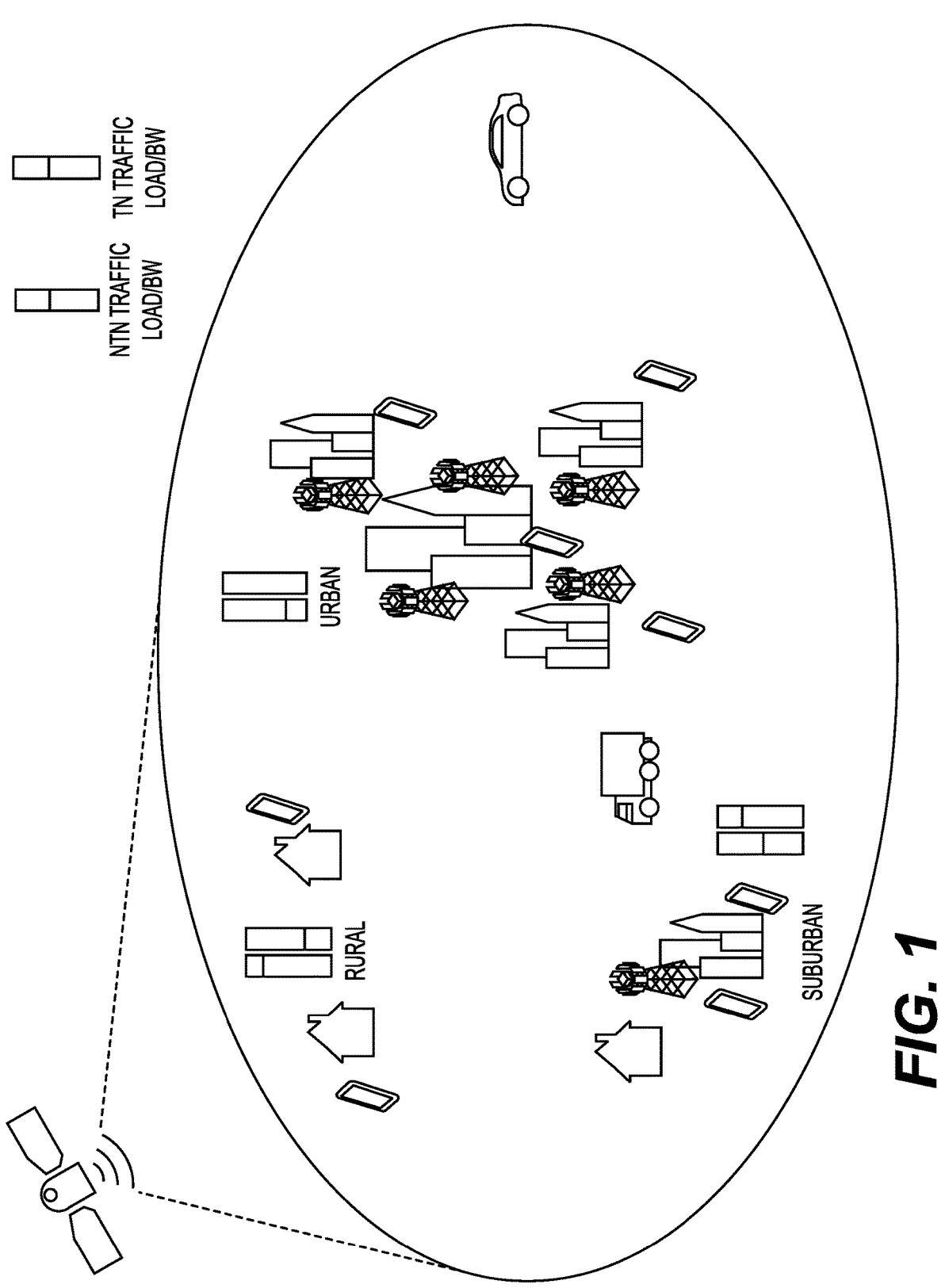
FIG. 1 illustrates a common scenario where there are varying usage rates of the non-terrestrial network (NTN) spectrum and the terrestrial network (TN) spectrum in different geographic locations.

FIG. 1 illustrates a common scenario depicting varying usage rates of the non-terrestrial network (NTN) spectrum and the terrestrial network (TN) spectrum in different geographic locations. As shown in FIG. 1, in urban areas, there is a high demand for TN spectrum, while NTN spectrum utilization remains low. In suburban areas, NTN traffic load increases as TN traffic load decreases. In rural areas, there may be a lack of TN coverage, resulting in a shortage of NTN spectrum. Considering these disparities in spectrum utilization across different areas, it is desirable to allocate the spectrum resources in a coordinated manner so as to meet the specific demands of each geographic location and provide enhanced network services.

FIGS. 2A-2D show typical observations regarding the uplink (UL) and downlink (DL) performance of the NTN when encountering interference from TN base stations (BSs) and TN user equipments (UEs).

Figures 2A, 2B:
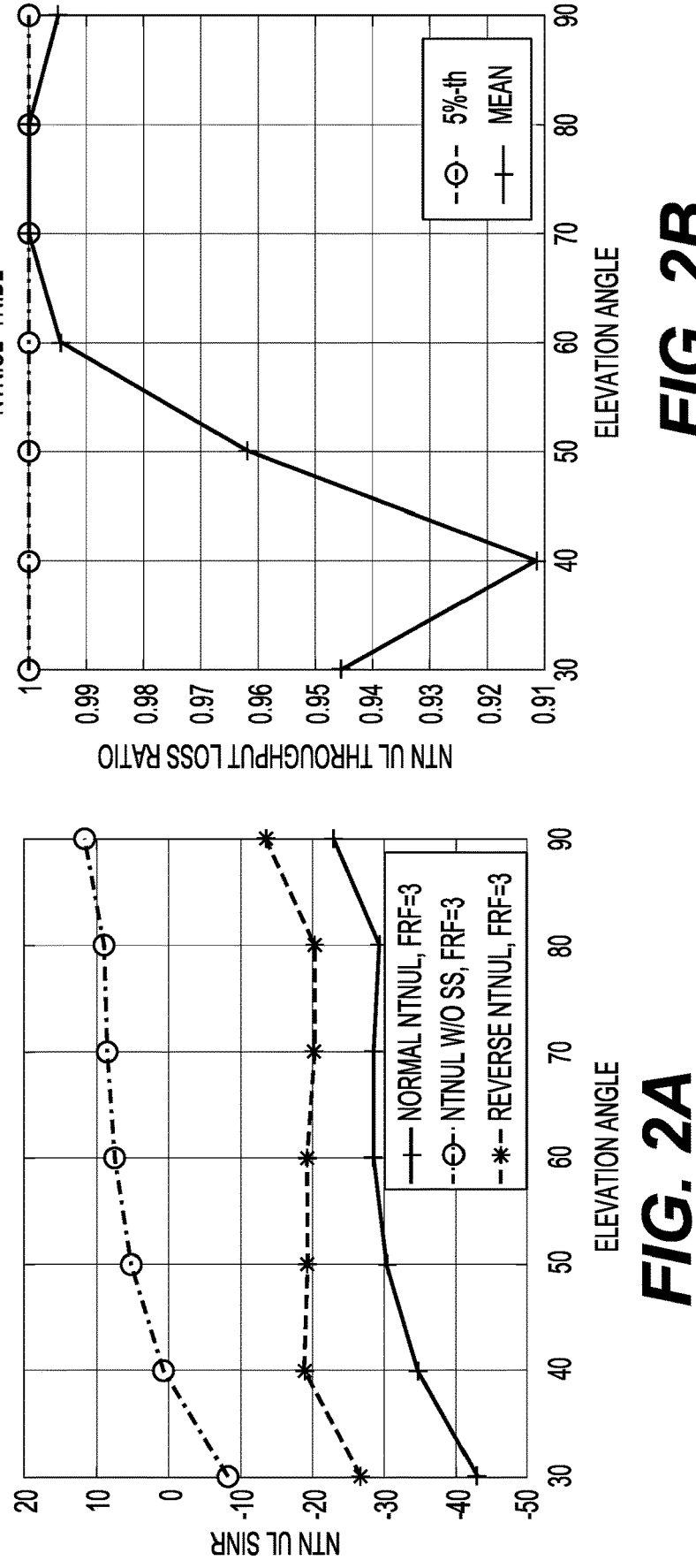
FIGS. 2A-2D show typical observations regarding the uplink and downlink performance of the NTN when there is interference from TN base stations (TN BSs) and TN user equipments (TN UEs)
Figures 2C, 2D:
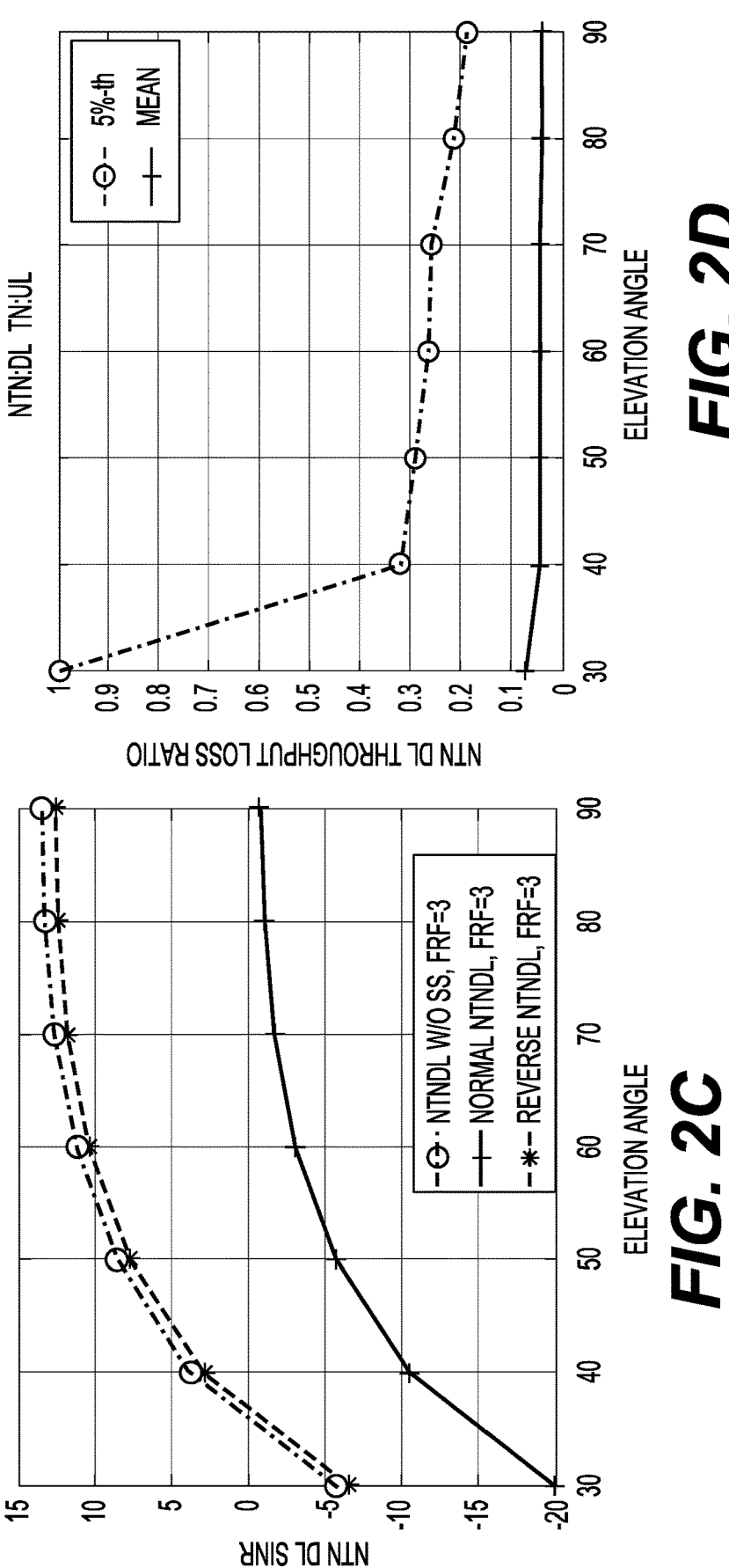

As can be seen from FIGS. 2A and 2B regarding NTN UL performance, the average throughput loss ratio exceeds 90%, indicating significant degradation. NTN UL operations are heavily affected when the signal-to-interference-plus-noise ratio (SINR) falls below −10 dB. As can be seen from FIGS. 2C and 2D regarding NTN DL performance, the average throughput loss ratio is less than 10%. However, the 5%-tile worst NTN UE experiences a throughput loss ratio larger than 20%. The root causes for these issues can be attributed to severe aggregated TN BS interference and severe aggregated TN UE interference. To provide a reliable network experience, it is necessary to mitigate the impact of such interference on the performance of NTN communications.

Figure 3:
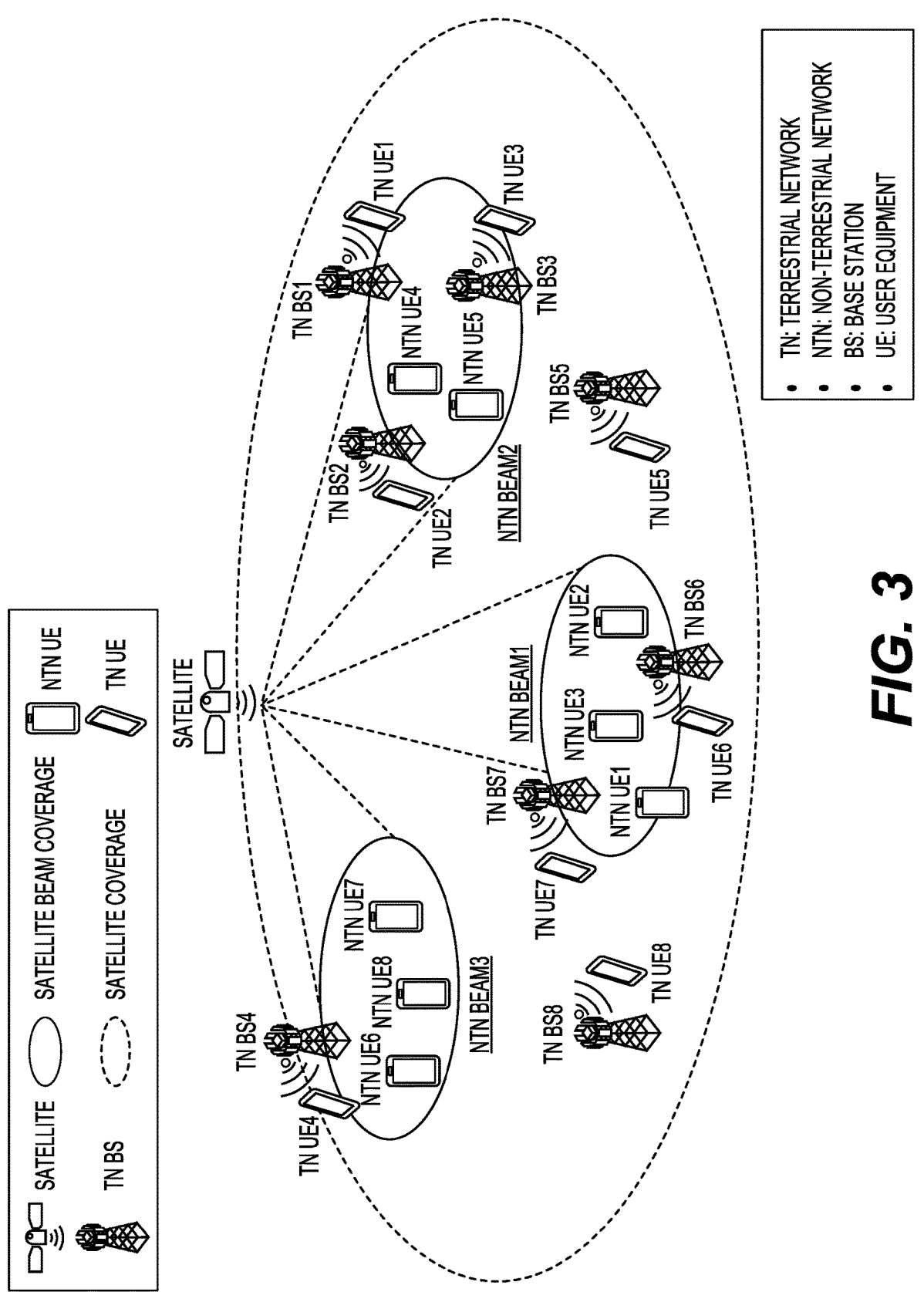
FIG. 3 shows a non-limiting example of the infrastructure of a coordinated TN-NTN framework, in accordance with embodiments of the disclosure.

FIG. 3 illustrates a non-limiting example of the infrastructure of a coordinated TN-NTN framework, in accordance with embodiments of the disclosure. Multiple terrestrial network base stations (e.g., TN BSs 1-8) are strategically located within the satellite coverage represented by the dashed ellipse, serving a plurality of terrestrial network user equipments (e.g., TN UEs 1-8). Moreover, within the coverage areas of individual satellite beams (e.g., NTN cells or NTN beams 1-3), a plurality of non-terrestrial network user equipments (e.g., NTN UEs 1-8) can access wireless communication services provided by the non-terrestrial network.

By analyzing the Reference Signals Received Power (RSRP) (or the Reference Signals Received Quality (RSRQ)) in the NTN beam (or the NTN cell), the coverage of the NTN beam can be determined. This determination can be based on comparing the received RSRP or RSRQ at the satellite from the NTN UE in question (or at the NTN UE in question from the satellite) against a predefined threshold. If the measured values exceed this threshold, it indicates that the NTN UE is within the coverage of the NTN beam.

In accordance with embodiments of this disclosure, coordination is established between TN and NTN radio resources to optimize spectrum allocation, enhance coverage, and improve overall network performance. The radio resources assigned for the TN cells can partially overlap with the radio resources assigned for the NTN cells. This partial overlap between the radio resources can involve the frequency domain, the time domain, and/or the polarization direction, enabling efficient utilization and allocation of resources within the coordinated TN-NTN framework.

Figure 4:
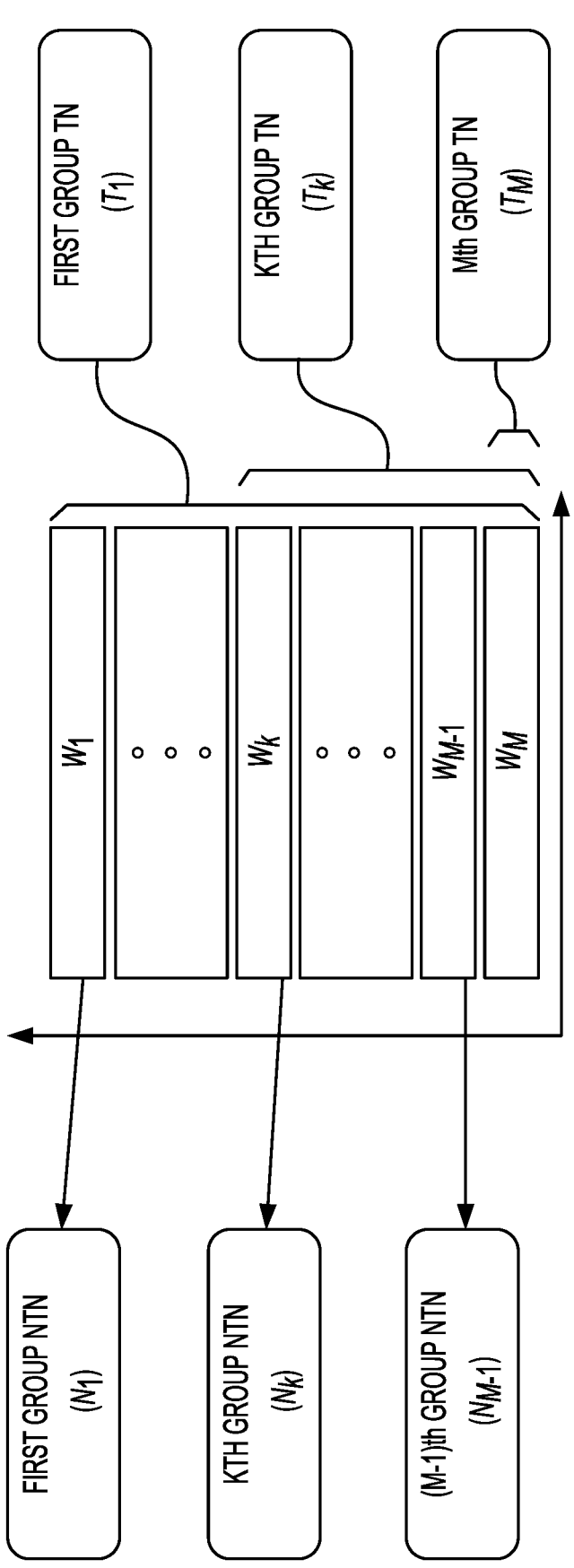
FIG. 4 shows a non-limiting example of a scheme for allocating radio resources between NTN UEs and TN BSs, in accordance with embodiments of the disclosure.

FIG. 4 presents a non-limiting example of a scheme for performing coordinated allocation of radio resources between NTN UEs and TN BSs, in accordance with embodiments of the disclosure.

According to one embodiment of the disclosure, based on a set of predefined threshold(s)

$$\{\delta_1^{NTN}, \delta_2^{NTN}, \dots, \delta_{M-2}^{NTN}\},$$

the NTN UEs can be divided into (M−1) groups, i.e., {N$_1$, N$_2$, ..., N$_{M-1}$}. The radio resources can be partitioned into M parts, W$_1$, W$_2$, ..., W$_M$. Each of the (M−1) parts of the radio resources can be assigned to a specific group of the NTN UEs.

For example, as shown in FIG. 4, the first part W$_1$ of the radio resources can be assigned to the first group N$_1$ of the NTN UEs, the k-th part W$_k$ of the radio resources can be assigned to the k-th group N$_k$ of the NTN UEs, and the (M−1)-th part W$_{M-1}$ of the radio resources is assigned to the (M−1)-th group N$_{M-1}$ of the NTN UEs, where 1<k<M−1. Note that the M-th part W$_M$ of the radio resources is exclusively reserved for TN BS usage, and thus is not assigned to any NTN IE group.

For example, the i-th part W$_i$ of the radio resources can be determined by $$W_i = (W - W_M) * |N_i|/(\text{sum}(|N_1|, |N_2|, \dots, |N_{M-1}|)),$$

where |N$_i$| denotes the number of the NTN UEs included in the i-th NTN UE group N$_i$, and i=1, 2, ..., M−1. Furthermore, each NTN UE in the group N$_i$ receives a portion of W$_i$, denoted as bw$_i$, which is determined by $$bw_i = W_i/|N_i|.$$

Similarly, based on a set of predefined thresholds $$\{\delta_1^{TN}, \delta_2^{TN}, \dots, \delta_{M-1}^{TN}\}),$$

the TN BSs can be divided into M groups, i.e., {T$_1$, T$_2$, ..., T$_M$}. The sum of radio resources (W$_k$, W$_{k+1}$, ..., W$_M$) can be assigned to the k-th TN BS group T$_k$, where 1≤k≤M.

Note that it is possible for some of the (M−1) NTN UE groups to be empty. For example, when M=4, the NTN UEs are divided into three groups: N1, N2, and N3. In this scenario, it is possible that only the groups N1 and N2 contain NTN UEs, while the group N3 does not have any NTN UEs. Similarly, some of the M TN BS groups can also be empty. For example, it is possible that only the groups T1, T2, and T4 have TN BSs, while the group T3 does not have any TN BSs.

In the above-described embodiment, the NTN UEs and TN BSs are grouped based on two sets of predefined thresholds. However, in another embodiment of the disclosure, grouping can be accomplished using an objective function.

Specifically, the maximum number (i.e., M) of the radio resource groups and the unit resources (i.e., $\{bw_i, bw_2, \ldots, bw_{M-1}\}$) for each of the radio resource groups $W_1$, $W_2, \ldots, W_{M-1}$ can be pre-determined, and an objective function can be pre-defined.

To maximize the objective function, two sets of threshold parameters can be determined. The first set of threshold parameters $$\{\delta_1^{NTN}, \delta_2^{NTN}, \ldots, \delta_{M-2}^{NTN}\},$$

is used for grouping the NTN UEs, while the second set of threshold parameters $$\{\delta_1^{TN}, \delta_2^{TN}, \ldots, \delta_{M-1}^{TN}\}$$

is used for grouping the TN BSs.

Using the first set of threshold parameters $$\{\delta_1^{NTN}, \delta_2^{NTN}, \ldots, \delta_{M-2}^{NTN}\},$$

the NTN UEs can be divided into (M−1) groups, i.e., $\{N_1, N_2, \ldots, N_{M-1}\}$. Similarly, using the second set of threshold parameters $$\{\delta_1^{TN}, \delta_2^{TN}, \ldots, \delta_{M-1}^{TN}\},$$

the TN BSs can be grouped into M groups, i.e., $\{T_1, T_2, \ldots, T_M\}$.

As mentioned previously, it is possible for some of the (M−1) NTN UE groups to be empty. Similarly, some of the M TN BS groups can also be empty.

Based on the number of NTN UEs in each NTN UE group and the unit resource for each radio resource group, the total radio resources W can be partitioned into M parts, $\{W_1, W_2, \ldots, W_M\}$, where $W_i=|N_i|*bw_i$, for i=1, 2, . . . , M−1, and $W_M=W-sum(W_1, W_2, \ldots W_{M-1})$.

The k-th part $W_k$ of the radio resources can be assigned to the k-th NTN UE group $N_k$, where 1≤k≤M−1. For i=1, 2, . . . , M−1, each NTN UE in the i-th group $N_i$ is allocated a portion of the radio resource, which has a size equal to $bw_i$. The sum of radio resources $(W_k, W_{k+1}, \ldots, W_M)$ can be assigned to the k-th TN BS group $T_k$, where 1≤k≤M.

Note that although in the above examples, NTN UEs are divided into (M−1) groups, other numbers of NTN UE groups are possible. For instance, M, (M−2), or (M−3) NTN UE groups can be used without departing from the spirit and scope of this disclosure.

The objective function can be formulated in various ways. Here, four non-limiting examples of the objective function are provided. Those skilled in the art can recognize that other forms of the objective function are also possible.

Example 1: (sum of TN BSs' throughput in group $T_1$, $T_2, \ldots, T_M$)*(sum of NTN UEs' throughput in group $N_1, N_2, \ldots, N_{M-1}$).

Example 2: $(1-\alpha)$*(sum of TN BSs' throughput in group $T_1, T_2, \ldots, T_M$)+$\alpha$*(sum of NTN UEs' throughput in group $N_1, N_2, \ldots, N_{M-1}$), where $\alpha \in (0,1)$ is a weighted factor.

Example 3: (sum of TN BSs' obtained bandwidth in group $T_1, T_2, \ldots, T_M$)*(sum of NTN UEs' throughput in group $N_1, N_2, \ldots, N_{M-1}$).

Example 4: $(1-\alpha)$*(sum of TN BSs' obtained bandwidth in group $T_1, T_2, \ldots, T_M$)+$\alpha$*(sum of NTN UEs' throughput in group $N_1, N_2, \ldots, N_{M-1}$), where $\alpha \in (0,1)$ is a weighted factor.

Figure 5:
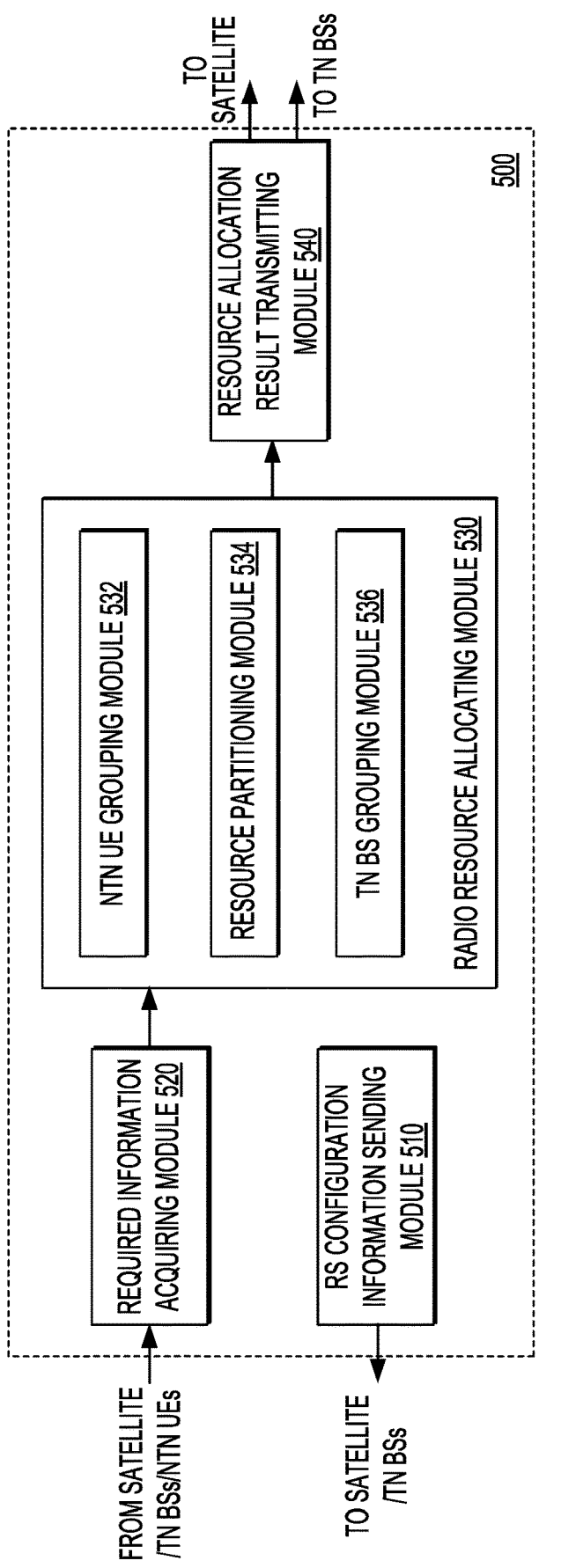
FIG. 5 shows a block diagram of an apparatus for performing the coordinated allocation of radio resources between NTN UEs and TN BSs, in accordance with embodiments of the disclosure.

FIG. 5 shows a block diagram of an apparatus 500 for performing the coordinated allocation of radio resources between the NTN UEs and the TN BSs, in accordance with embodiments of the disclosure. The apparatus 500 includes an RS configuration information sending module 510, a required information acquiring module 520, a radio resource allocating module 530, and a resource allocation result transmitting module 540.

The RS Configuration Information Sending Module 510 sends reference signal (RS) configuration information to the satellite and the TN BSs. The RS configuration information defines how a reference signal that is to be used for acquiring the information necessary to allocate radio resources is transmitted. For example, the RS configuration information specifies the resource blocks on which the reference signal should be transmitted.

The required information acquiring module 520 acquires, from the satellite, the TN BSs, and/or the NTN UEs, information that is required to make radio resource allocation decisions. Two examples illustrating the specifics of this acquired information will be described below.

Based on the information acquired by the required information acquiring module 520, the radio resource allocating module 530 determines the optimal allocation of radio resources between the TN BS groups and the NTN UE groups. Consequently, the radio resource allocating module 530 generates resource allocation results. The radio resource allocating module 530 can include three sub-modules: an NTN UE grouping module 532, a resource partitioning module 534, and a TN BS grouping module 536. These sub-modules can handle NTN UE grouping, radio resource partitioning, and TN BS grouping, respectively.

The resource allocation result transmitting module 540 receives the resource allocation results generated by the radio resource allocation module 530, and transmits them to the satellite and the TN BSs.

For instance, the resource allocation results can be transmitted via unicast communication. In cases where the radio resources are partitioned in the frequency domain, the allocated frequency ranges and their corresponding valid duration can be transmitted to the respective TN BSs and the satellite.

Upon receiving the resource allocation results, the TN BSs and the satellite can configure or de-configure cells based on the received information. Additionally, they can broadcast cell information and deconfiguration details to the UEs within the cells. This ensures that the UEs are informed of the cell configuration changes.

Once the UEs receive the cell configuration or deconfiguration information, they can acknowledge its receipt by returning an acknowledgement message. Then, the UEs can access or leave the cell as required, aligning their behavior with the updated configuration.

In FIG. 5, the modules 510, 520, 530, and 540 are depicted as integrated within a single apparatus 500, which can be positioned at various locations within the TN-NTN framework. These locations include, but are not limited to, TN BSs and the satellite. It should be noted that the functionality of the apparatus 500 can also be implemented through separate function modules distributed across the TN-NTN framework.

For instance, a server can be responsible for collecting the information necessary to determine radio resource allocation, while a controller can decide resource allocation based on the information collected by the server. Note that this is merely a non-restrictive example, as those skilled in the art can recognize that there are various alternative approaches to accomplish the radio resource allocation.

FIG. 6 shows a flow chart of a process 600 for performing the coordinated allocation of radio resources between NTN UEs and TN BSs, in accordance with embodiments of the disclosure. The process 600 starts with step S610, where the RS configuration information is sent to the satellite and the TN BSs.

In step S620, the required information for performing the radio resource allocation is acquired from the satellite, NTN UEs, and/or TN BSs.

In step S630, using the set of thresholds $$\{\delta_1^{NTN}, \delta_2^{NTN}, \dots, \delta_{M-2}^{NTN}\},$$

the NTN UEs are divided into different groups based on the acquired information. As described above, the set of thresholds can be predefined for the TN-NTN framework, or determined using an objective function.

In step S640, the radio resources can be partitioned. In step S650, using the set of thresholds $$\{\delta_1^{TN}, \delta_2^{TN}, \dots, \delta_{M-1}^{TN}\}),$$

the TN BSs can be grouped. In step S660, the radio resources can be allocated for the NTN UE groups and the TN BS groups in a manner described with reference to FIG. 4. In step S670, the radio resource allocation results can be transmitted to the satellite and the TN BSs.

In the following two examples, further details of the radio resource allocation process are provided.

Example 1

As described with reference to FIGS. 5-6, the process for allocating radio resources between TN BSs and NTN UEs can include the following primary Procedures 1-3.

(1) Procedure 1: Acquiring the Required Information

The required information can include: (i) information that facilitates to determine the NTN UE groups, and (ii) information that facilitates to determine the TN BS groups.

For instance, the information that facilitates to determine the NTN UE groups can include: (a) the received RSRP at the satellite from each NTN UE in the NTN beam, and (b) the received RSRP at each NTN UE from the satellite in the NTN beam, etc.

The information that facilitates to determine the TN BS groups can include: (a) a coupling loss, which can be defined as the path loss minus the transmitter's and the receiver's antenna gain, of each TN BS to the satellite, where the coupling loss can be inferred from a satellite reference signal received at the TN BS; (b) the coupling loss of each TN BS to the satellite, where the coupling loss can be inferred from a TN BS reference signal received at the satellite; (c) the coupling loss of each TN BS to the NTN UEs, where the coupling loss can be inferred from the NTN UEs' reference signal received at the TN BS; (d) the coupling loss of each TN BS to the NTN UEs, where the coupling loss can be inferred from the TN BS's reference signal received at the NTN UEs, for example.

(2) Procedure 2: Grouping the NTN UEs, Grouping the TN BSs, Partitioning the Radio Resources, and Allocating the Radio Resources to the NTN UEs and the TN BSs As described with reference to FIG. 4, the NTN UEs in each NTN beam can be divided into (M−1) NTN UE groups, the radio resources can be partitioned into M non-overlapping radio resource parts; and the TN BSs in the satellite's coverage can be divided into M TN BS groups. The k-th radio resource part can be allocated to the k-th NTN UE group, where 1≤k≤M−1. The sum of the k-th to M-th radio resource parts can be allocated to the k-th TN BS group, where 1≤k≤M.

(A) Procedure 2-1: Dividing the NTN UEs in Each NTN Beam into (M−1) NTN UE Groups According to one embodiment, the NTN UEs can be classified into M−1 groups, based on the received RSRP at the satellite. For example, the satellite can measure the received power of a UL signal (e.g., Sounding reference signal (SRS), preamble, Physical Uplink Control Channel (PUCCH), Physical Uplink Shared Channel (PUSCH), etc.) from the NTN UEs in the beam. Then, the NTN UE groups can be determined based on the individual received UL signal power and the predefined threshold set $$(e.g., \{\delta_1^{NTN}, \delta_2^{NTN}, \dots, \delta_{M-2}^{NTN}\}).$$

For instance, with M=4, three NTN UE groups can be obtained, where $N_1$={NTN UE id|the received NTN UL signal $$power \leq \delta_1^{NTN}\},$$

$$N_2 = \{NTN\ UE\ id\,|\,\delta_1^{NTN} < the\ received\ NTN\ UL\ signal\ power \leq \delta_2^{NTN}\},$$

$$and\ N_3 = \{NTN\ UE\ id\,|\,\delta_2^{NTN} < the\ received\ NTN\ UL\ signal\ power\}.$$

According to an alternative embodiment, the NTN UEs can be classified into M−1 groups, based on the received RSRP at the NTN UEs. For example, the NTN UEs in the beam measures the received power of a DL signal (e.g., Synchronization Signal Block (SSB), Reference signal (RS), Channel State Information Reference Signal (CSI-RS), Tracking reference signaling (TRS), Physical Downlink Control Channel (PDCCH), Physical Downlink Shared Channel (PDSCH), etc.) from the satellite. Then, the NTN UE groups can be determined based on the individual received DL signal power and the predefined threshold set (e.g., $$\left(\text{e.g., } \left\{\delta_1^{NTN}, \delta_2^{NTN}, \ldots, \delta_{M-2}^{NTN}\right\}\right).$$

For instance, with M=4, three NTN UE groups can be obtained, where $$N_1 = \left\{NTN\ UE\ id \middle| \text{the received } NTN\ DL \text{ signal power} \leq \delta_1^{NTN}\right\},$$
$$N_2 = \left\{NTN\ UE\ id \middle| \delta_1^{NTN} < \text{the received } NTN\ DL \text{ signal power} \leq \delta_2^{NTN}\right\}, \text{ and}$$
$$N_3 = \left\{NTN\ UE\ id \middle| \delta_2^{NTN} < \text{the received } NTN\ DL \text{ signal power}\right\}.$$

(B) Procedure 2-2: Partitioning the Radio Resources into M Non-Overlapping Radio Resource Parts Partitioning of the radio resources can be performed across various domains, including but not limited to the frequency domain, the time domain, and the polarization direction.

For example, in the frequency domain, the radio resources W can be partitioned according to the number of NTN UEs in each NTN UE group. For a part $W_i$ with i=1, 2, ... M−1, $W_i=(W−W_M)*|N_i|/(\text{sum}(|N_1|, |N_2|, \ldots, |N_{M-1}|))$, where the part $W_M$ is exclusively reserved for TN BS usage.

As another example, the radio resources W can be partitioned in the time domain, according to the number of NTN UEs in each NTN UE group. For a part $W_i$ with i=1, 2, ... M−1, $W_i=(W−W_M)*|N_i|/(\text{sum}(|N_1|, |N_2|, \ldots, |N_{M-1}|))$, where $W_M$ is the part exclusively allocated for TN BS usage.

(C) Procedure 2-3: Grouping TN BS(s) in the Satellite's Coverage into M TN BS Groups According to one embodiment, the TN BSs can be classified into M groups, based on the coupling loss from each TN BS to the NTN beam of the satellite. For example, the coupling loss of each TN BS to the NTN beam of the satellite can be inferred from the satellite reference signal received at the TN BS, or the TN BS reference signal received at the satellite. Then, the TN BS groups can be determined based on the individual coupling loss from the TN BSs to the NTN beam of the satellite and the predefined threshold set (e.g., $$\left(\text{e.g., } \left\{\delta_1^{TN}, \delta_2^{TN}, \ldots, \delta_{M-1}^{TN}\right\}\right).$$

For instance, with M=4, four TN BS groups can be obtained, where $T_1$={TN BS id|the coupling loss from the TN BS to the NTN beam of the $$\text{satellite} \leq \delta_1^{TN}\}, \ T_2 = \left\{TN BS\ id \middle| \delta_1^{TN} < \text{the coupling loss}\right.$$

from the TN BS to the NTN beam of the $$\text{satellite} \leq \delta_2^{TN}\}, \ T_3 = \left\{TN BS\ id \middle| \delta_2^{TN} < \text{the coupling loss}\right.$$

from the TN BS to the NTN $$\text{satellite} \leq \delta_3^{TN}\}, \text{ and } T_4 = \left\{TN\ BS\ id \middle| \delta_3^{TN} < \text{the coupling loss}\right.$$

from the TN BS to the NTN beam of the satellite}.

According to an alternative embodiment, the TN BSs can be classified into M groups, based on the coupling loss from each TN BS to the NTN UEs in the beam. For example, the coupling loss of each TN BS to an NTN UE can be inferred from the NTN UEs' reference signal received at the TN BS, or the TN BS's reference signal received at the NTN UEs, etc. Then, the TN BS groups can be determined based on the individual coupling loss from the TN BS to the NTN UEs in the beam and the predefined threshold set $$\left(\text{e.g., } \left\{\delta_1^{TN}, \delta_2^{TN}, \ldots, \delta_{M-1}^{TN}\right\}\right).$$

For instance, with M=4, four TN BS groups can be obtained, where $T_1$={TN BS id|the coupling loss from the TN BS to a selected one of the NTN UEs in the $$\text{beam} \leq \delta_1^{TN}\}, \ T_2 = \left\{TNBS\ id \middle| \delta_1^{TN} < \text{the coupling loss}\right.$$

from the TN BS to the selected NTN UE in the $$\text{beam} \leq \delta_2^{TN}\}, \ T_3 = \left\{TNBS\ id \middle| \delta_2^{TN} < \text{the coupling loss}\right.$$

from the TN BS to the selected NTN UE in the $$\text{beam} \leq \delta_3^{TN}\}, \text{ and } T_4 = \left\{TNBS\ id \middle| \delta_3^{TN} < \text{the coupling loss}\right.$$

from the TN BS to the selected NTN UE in the beam}. The selection of the NTN UE can be based on various predefined criteria.

In another example with M=4, $T_1$={TN BS id|the average coupling loss from the TN BS to the NTN UEs in the $$\text{beam} \leq \delta_1^{TN}\}, \ T_2 = \left\{TNBS\ id \middle| \delta_1^{TN} < \text{the coupling loss}\right.$$

from the TN BS to the NTN UEs in the $$\text{beam} \leq \delta_2^{TN}\}, \ T_3 = \left\{TN\ BS\ id \middle| \delta_2^{TN} < \text{the average coupling loss}\right.$$

from the TN BS to the NTN UEs in the $$\text{beam} \leq \delta_3^{TN}\}, \text{ and } T_4 = \left\{TN\ BS\ id \middle| \delta_3^{TN} < \text{the average coupling loss}\right.$$

from the TN BS to the NTN UEs in the beam}.

In another example with M=4, $T_1$={TN BS id|the maximum coupling loss from the TN BS to the NTN UEs in the $$\text{beam} \le \delta_1^{TN}\}, \; T_2 = \{TN \; BS \; id \mid \delta_1^{TN} < \text{the maximum coupling loss}$$

from the TN BS to the NTN UEs in the $$\text{beam} \le \delta_2^{TN}\}, \; T_3 = \{TN \; BS \; id \mid \delta_2^{TN} < \text{the maximum coupling loss}$$

from the TN BS to the NTN UEs in the $$\text{beam} \le \delta_3^{TN}\}, \; \text{and } T_4 = \{TN \; BS \; id \mid \delta_3^{TN} < \text{the maximum coupling loss}$$

from the TN BS to the NTN UEs in the beam}.

In another example with M=4, $T_1$={TN BS id|the median coupling loss from the TN BS to the NTN UEs in the $$\text{beam} \le \delta_1^{TN}\}, \; T_2 = \{TN \; BS \; id \mid \delta_1^{TN} < \text{the median coupling loss}$$

from the TN BS to the NTN UEs in the $$\text{beam} \le \delta_2^{TN}\}, \; T_3 = \{TN \; BS \; id \mid \delta_2^{TN} < \text{the median coupling loss}$$

from the TN BS to the NTN UEs in the $$\text{beam} \le \delta_3^{TN}\}, \; \text{and } T_4 = \{TN \; BS \; id \mid \delta_3^{TN} < \text{the median coupling loss}$$

from the TN BS to the NTN UEs in the beam}.

(D) Procedure 2-4: Allocating the Radio Resource Parts

In this procedure, the k-th radio resource part can be allocated to the corresponding k-th NTN UE group. Specifically, the ratio resource part $W_i$ is assigned to the NTN UE group $N_i$, where i=1, 2, . . . , M−1. The radio resource assigned to each NTN UE in the group $N_i$ is determined by $bw_i = W_i / |N_i|$.

Additionally, the sum of the radio resource parts from $W_k$ to $W_M$ is assigned to the k-th TN BS group. In other words, the resource parts, $W_k + W_{k+1} + \ldots + W_M$, are assigned to the k-th TN BS group, where $1 \le k \le M$.

(3) Procedure 3: Sending Resource Allocation Results to the TN BSs and the Satellite.

For example, the information regarding $bw_i$, and $W_i$ for each NTN UE within the NTN UE group $N_i$ can be sent to the satellite, where i=1, 2, . . . , M−1. Similarly, the information regarding $W_i$, $W_{i+1}$, . . . , $W_M$ can be sent to each TN BS within the TN BS group Ti, where i=1, 2, . . . , M.

Example 2

In this example, the process for allocating radio resources between TN BSs and NTN UEs mainly includes procedures 1-3 as well. Since Procedures 1 and 3 are the same as those described in Example 1, the description of these procedures is omitted.

(A) Procedure 2-1: Determining the Threshold Parameter Sets

In this procedure, two sets of threshold parameters are determined to maximize the objective function. The first set of threshold parameters $$\{\delta_1^{NTN}, \delta_2^{NTN}, \ldots, \delta_{M-2}^{NTN}\}$$

is used for grouping the NTN UEs, while the second set of threshold parameters $$\{\delta_1^{TN}, \delta_2^{TN}, \ldots, \delta_{M-1}^{TN}\}$$

is used for grouping the TN BSs.

For example, the objective function can be designed as (sum of TN BSs' obtained bandwidth in group $T_1$, . . . $T_M$)*(sum of NTN UEs' throughput in group $N_1$, . . . $N_{M-1}$), which can be given by:

$$\max_{\delta^{TN}, \delta^{NTN}} \left( \sum_{i \in T_1(\delta_1^{TN})} \sum_{k=1}^{M} w_k + \sum_{j=2}^{M-1} \sum_{i \in T_j(\delta_{j-1}^{TN}, \delta_j^{TN})} \sum_{k=j}^{M} w_k + \sum_{i \in T_M(\delta_{M-1}^{TN})} w_M \right)$$

$$\left( b_1^N \sum_{k \in N_1(\delta_1^{NTN})} \Gamma_k^{N_j}(\delta_1^{TN}) + \sum_{j=2}^{M-2} b_j^N \sum_{k \in N_j(\delta_{j-1}^{NTN}, \delta_j^{NTN})} \Gamma_k^{N_j}(\delta_1^{TN}, \ldots, \delta_j^{TN}) + \right.$$

$$\left. b_{M-1}^N \sum_{k \in N_{M-1}(\delta_{M-1}^{NTN})} \Gamma_k^{N_{M-1}}(\delta_1^{TN}, \ldots, \delta_{M-1}^{TN}) \right)$$

where $$\Gamma_k^{N_j}$$

denotes the $\log(1+\text{SINR})$ of an NTN UE k in the group $N_j$.

Other examples of the objective function can include but not limited to:

(sum of *TN BSs'* throughput in group $T_1$, . . . $T_M$)*(sum of *NTN UEs'* throughput in group $N_1$, . . . $N_{M-1}$), $(1-\alpha)$*(sum of *TN BSs'* throughput in group $T_1$, . . . $T_M$)+$\alpha$*(sum of *NTN UEs'* throughput in group $N_1$, . . . $N_{M-1}$), where $\alpha \in (0,1)$ is a weighted factor, and $(1-\alpha)$*(sum of *TN BSs'* obtained bandwidth in group $T_1$, . . . $T_M$)+$\alpha$*(sum of *NTN UEs'* throughput in group $N_1$, . . . $N_{M-1}$), where $\alpha \in (0,1)$ is a weighted factor.

(B) Procedure 2-2: Dividing the NTN UEs in Each NTN Beam into (M−1) Groups

According to one embodiment, the NTN UEs can be classified into M−1 groups, based on the received RSRP at the satellite. For example, the satellite can measure the received power of a UL signal (e.g., SRS, preamble, PUCCH, PUSCH, etc.) from the NTN UEs in the beam.

Then, the NTN UE groups can be determined based on the individual received UL signal power and the threshold parameter set $$(\text{e.g., } \{\delta_1^{NTN}, \delta_2^{NTN}, \dots, \delta_{M-2}^{NTN}\})$$

obtained in Procedure 2-1.

For instance, with M=4, three NTN UE groups can be obtained, where $N_1$={NTN UE id|the received NTN UL $$\text{signal power} \leq \delta_1^{NTN}\}, N_2 =$$

$$\{NTN\ UE\ id | \delta_1^{NTN} < \text{the received } NTN\ UL \text{ signal power} \leq \delta_2^{NTN}\},$$

$$\text{and } N_3 = \{NTN\ UE\ id | \delta_2^{NTN} < \text{the received } NTN\ UL \text{ signal power}\}.$$

According to an alternative embodiment, the NTN UEs can be classified into M−1 groups, based on the received RSRP at the NTN UEs. For example, the NTN UE in the beam measures the received power of a DL signal (e.g., SSB, RS, CSI-RS, TRS, PDCCH, PDSCH, etc.) from the satellite. Then, the NTN UE groups can be determined based on the individual received DL signal power and the threshold parameter set $$(\text{e.g., } \{\delta_1^{NTN}, \delta_2^{NTN}, \dots, \delta_{M-2}^{NTN}\})$$

obtained in Procedure 2-1.

For instance, with M=4, three NTN UE groups can be obtained, where
$N_1$={NTN UE id| the received NTN DL $$\text{signal power} \leq \delta_1^{NTN}\}, N_2 =$$

$$\{NTN\ UE\ id | \delta_1^{NTN} < \text{the received } NTN\ DL \text{ signal power} \leq \delta_2^{NTN}\},$$

$$\text{and } N_3 = \{NTN\ UE\ id | \delta_2^{NTN} < \text{the received } NTN\ DL \text{ signal power}\}.$$

Procedure 2-3: Partitioning the Radio Resources into M Non-Overlapping Radio Resource Parts Partitioning of the radio resources can be performed across various domains, including but not limited to the frequency domain, the time domain, and the polarization direction.

For example, in the frequency domain, the radio resources W can be partitioned according to the number of NTN UEs in each NTN UE group. For a part $W_i$ with i=1, 2, . . . M−1, $W_i$=|$N_i$|*$bw_i$; or $W_i$=(W−$W_M$)*|$N_i$|/(sum(|$N_1$|, |$N_2$|, . . . , |$N_{M-1}$|)).

As another example, the radio resources W can be partitioned in the time domain, according to the number of NTN UEs in each NTN UE group. For a part $W_i$ with i=1, 2, . . . M−1, $W_i$=|$N_i$|*$bw_i$; or $W_i$=(W−$W_M$)*|$N_i$|/(sum(|$N_1$|, |$N_2$|, . . . , |$N_{M-1}$|)).

In both examples above, the part $W_M$ is exclusively reserved for TN BS usage. For instance, the part $W_M$ can be predetermined, or determined by $W_M$=the total radio resources—sum($W_1$+ . . . +$W_{M-1}$).

(D) Procedure 2-4: Grouping TN BSs in the Satellite's Coverage into M TN BS Groups According to one embodiment, the TN BSs can be classified into M groups, based on the coupling loss from each TN BS to the NTN beam of the satellite. For example, the coupling loss of each TN BS to the NTN beam of the satellite can be inferred from the satellite reference signal received at the TN BS, or the TN BS reference signal received at the satellite. Then, the TN BS groups can be determined based on the individual coupling loss from the TN BSs to the NTN beam of the satellite and the threshold parameter set $$(\text{e.g., } \{\delta_1^{TN}, \delta_2^{TN}, \dots, \delta_{M-1}^{TN}\})$$

obtained in Procedure 2-1.

For instance, with M=4, four TN BS groups can be obtained, where $T_1$={TN BS id|the coupling loss from the TN BS to the NTN beam of the $$\text{satellite} \leq \delta_1^{TN}\}, T_2 = \{TN\ BS\ id | \delta_1^{TN} < \text{the coupling loss}$$

from the TN BS to the NTN beam of the $$\text{satellite} \leq \delta_2^{TN}\}, T_3 = \{TN\ BS\ id \mid \delta_2^{TN} < \text{the coupling loss}$$

from the TN BS to the NTN beam of the $$\text{satellite} \leq \delta_3^{TN}\}, \text{ and } T_4 = \{TN\ BS\ id \mid \delta_2^{TN} < \text{the coupling loss}$$

from the TN BS to the NTN beam of the satellite}.

According to an alternative embodiment, the TN BSs can be classified into M groups, based on the coupling loss from each TN BS to the NTN UEs in the beam. For example, the coupling loss of each TN BS to an NTN UE can be inferred from the NTN UEs' reference signal received at the TN BS, or the TN BS's reference signal received at the NTN UEs, etc. Then, the TN BS groups can be determined based on the individual coupling loss from the TN BS to the NTN UEs in the beam and the threshold parameter set $$(\text{e.g., } \{\delta_1^{TN}, \delta_2^{TN}, \dots, \delta_{M-1}^{TN}\})$$

obtained in Procedure 2-1.

For instance, with M=4, four TN BS groups can be obtained, where $T_1$={TN BS id|the coupling loss from the TN BS to a selected one of the NTN UEs in the $$\text{beam} \leq \delta_1^{TN}\}, \ T_2 = \{TN\ BS\ id \mid \delta_1^{TN} < \text{the coupling loss}$$

from the TN BS to the selected NTN UE in the $$\text{beam} \leq \delta_2^{TN}\}, \ T_3 = \{TN\ BS\ id \mid \delta_2^{TN} < \text{the coupling loss}$$

from the TN BS to the selected NTN UE in the $$\text{beam} \le \delta_3^{TN}\}, \text{ and } T_4 = \{TN\ BS\ id\ |\ \delta_3^{TN} < \text{the coupling loss}$$

from the TN BS to the selected NTN UE in the beam}. One skilled in the art can recognize that various predefined criteria can be applied to select the NTN UE.

In another example with M=4, $T_1$={TN BS id|the average coupling loss from the TN BS to the NTN UEs in the $$\text{beam} \le \delta_1^{TN}\}, \quad T_2 = \{TN\ BS\ id\ |\ \delta_1^{TN} < \text{the average coupling loss}$$

from the TN BS to the NTN UEs in the $$\text{beam} \le \delta_2^{TN}\}, \quad T_3 = \{TN\ BS\ id\ |\ \delta_2^{TN} < \text{the average coupling loss}$$

from the TN BS to the NTN UEs in the $$\text{beam} \le \delta_3^{TN}\}, \text{ and } T_4 = \{TN\ BS\ id|\delta_3^{TN} < \text{the average coupling loss}$$

from the TN BS to the NTN UEs in the beam}.

In another example with M=4, $T_1$={TN BS id|the maximum coupling loss from the TN BS to the NTN UEs in the $$\text{beam} \le \delta_1^{TN}\}, \text{ and } T_2 = \{TN\ BS\ id|\delta_1^{TN} < \text{the maximum coupling loss}$$

from the TN BS to the NTN UEs in the $$\text{beam} \le \delta_2^{TN}\}, T_3 = \{TN\ BS\ id|\delta_2^{TN} < \text{the maximum coupling loss}$$

from the TN BS to the NTN UEs in the $$\text{beam} \le \delta_3^{TN}\}, \text{ and } T_4 = \{TN\ BS\ id|\delta_3^{TN} < \text{the maximum coupling loss}$$

from the TN BS to the NTN UEs in the beam}.

In another example with M=4, $T_1$={TN BS id|the median coupling loss from the TN BS to the NTN UEs in the $$\text{beam} \le \delta_1^{TN}\}, \text{ and } T_2 = \{TN\ BS\ id|\delta_1^{TN} < \text{the mediam coupling loss}$$

from the TN BS to the NTN UEs in the $$\text{beam} \le \delta_2^{NTN}\}, T_3 = \{TN\ BS\ id|\delta_2^{NTN} < \text{the median coupling loss}$$

from the TN BS to the NTN UEs in the $$\text{beam} \le \delta_3^{TN}\}, \text{ and } T_4 = \{TN\ BS\ id|\delta_3^{TN} < \text{the mediam coupling loss}$$

from the TN BS to the NTN UEs in the beam}.

(E) Procedure 2-5: Allocating the Radio Resource Parts

In this procedure, the k-th radio resource part can be allocated to the corresponding k-th NTN UE group. Specifically, the ratio resource part $W_i$ is assigned to the NTN UE group $N_i$, where i=1, 2, . . . , M−1. The radio resource assigned to each NTN UE in the group $N_i$ is determined by $bw_i = W_i/|N_i|$.

Additionally, the sum of the radio resource parts from $W_k$ to $W_M$ is assigned to the k-th TN BS group. In other words, the resource parts, $W_k + W_{k+1} + \ldots + W_M$, are assigned to the k-th TN BS group, where 1≤k≤M.

Figure 7:
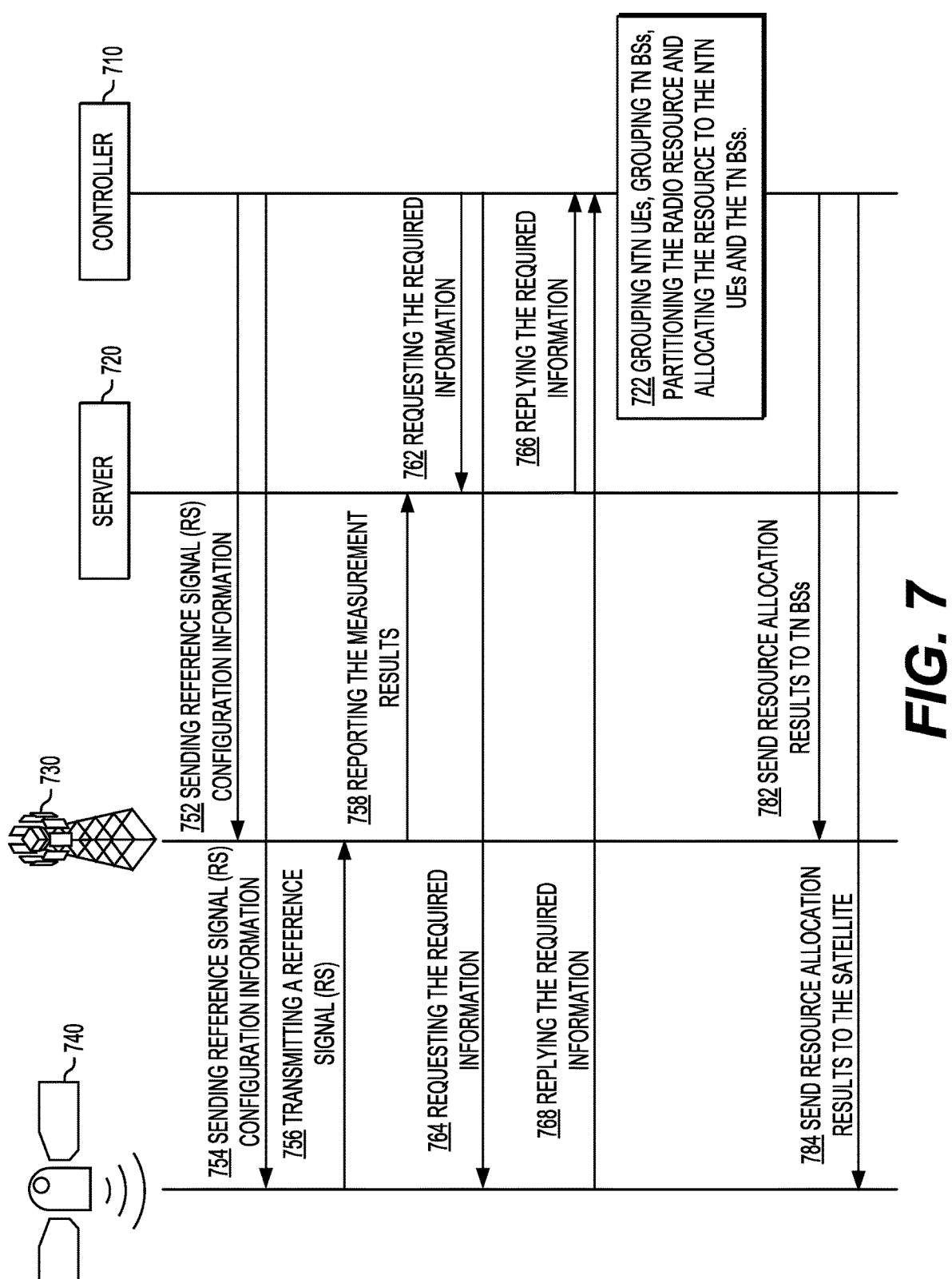
FIG. 7 shows a signal flow chart depicting the interaction between the resource allocation apparatus (represented as a separated server and a controller), the satellite, and the TN BS, in accordance with embodiments of the disclosure.

FIG. 7 shows a signal flow chart depicting the interaction between the resource allocation apparatus, the satellite, and an exemplary TN BS, in accordance with embodiments of the disclosure. As previously mentioned, the resource allocation apparatus can be implemented as a single unit or divided into separate modules. In the scenario shown in FIG. 7, a controller 710 and a server 720 collaborate to perform radio resource allocation. The server 720 is capable of acquiring the necessary information for resource allocation from the TN BSs, the satellite, and/or the NTN UEs (not shown in FIG. 7). The controller 710 can use the information collected by the server 720 (and sent directly from the satellite 740) to decide how to allocate the radio resources. Only one TN BS 730 is exemplified here, but there can be a plurality of TN BSs in practice.

At 752 and 754, the controller 710 can send reference signal (RS) configuration information to the TN BS 730 and the satellite 740. Then, the satellite 740 generates a reference signal based on the RS configuration information, and sends it at 756 to the TN BS 730. The TN BS can measure the reference signal based on the RS configuration information and report the measurement results at 758 to the server 720.

At 762, the controller 710 can send request messages to the server 720 and the satellite 740 to obtain information. At 766 and 768, the server 720 and the satellite 740 can respond to the controller 710 by sending response messages carrying the requested information. For example, the information sent at 766 can be the satellite reference signal measured at the TN BS 730, while the information sent at 768 can be the received RSRP at the satellite 740 from each NTN UE (not shown in FIG. 7) in the NTN beam.

At 772, the controller 710 can decide how to allocate the radio resources by grouping the NTN UEs, partitioning the radio resources, grouping the TN BSs, and assigning the radio resources between the NTN UEs and TN BSs. As described earlier, the NTN UEs in each NTN beam can be divided into (M−1) groups. The radio resources can be partitioned into M non-overlapping parts. The TN BSs in the satellite's coverage can be divided into M groups. The k-th part of the radio resources can be allocated to the k-th NTN UE group, where k ranges from 1 to M−1. The sum of the (k-th to M-th) radio resources to the kth TN BS group, where k ranges from 1 to M.

At 782 and 784, the controller 710 can transmit the resource allocation results to the TN BS 730 and the satellite 740 for implementation.

Figure 8:
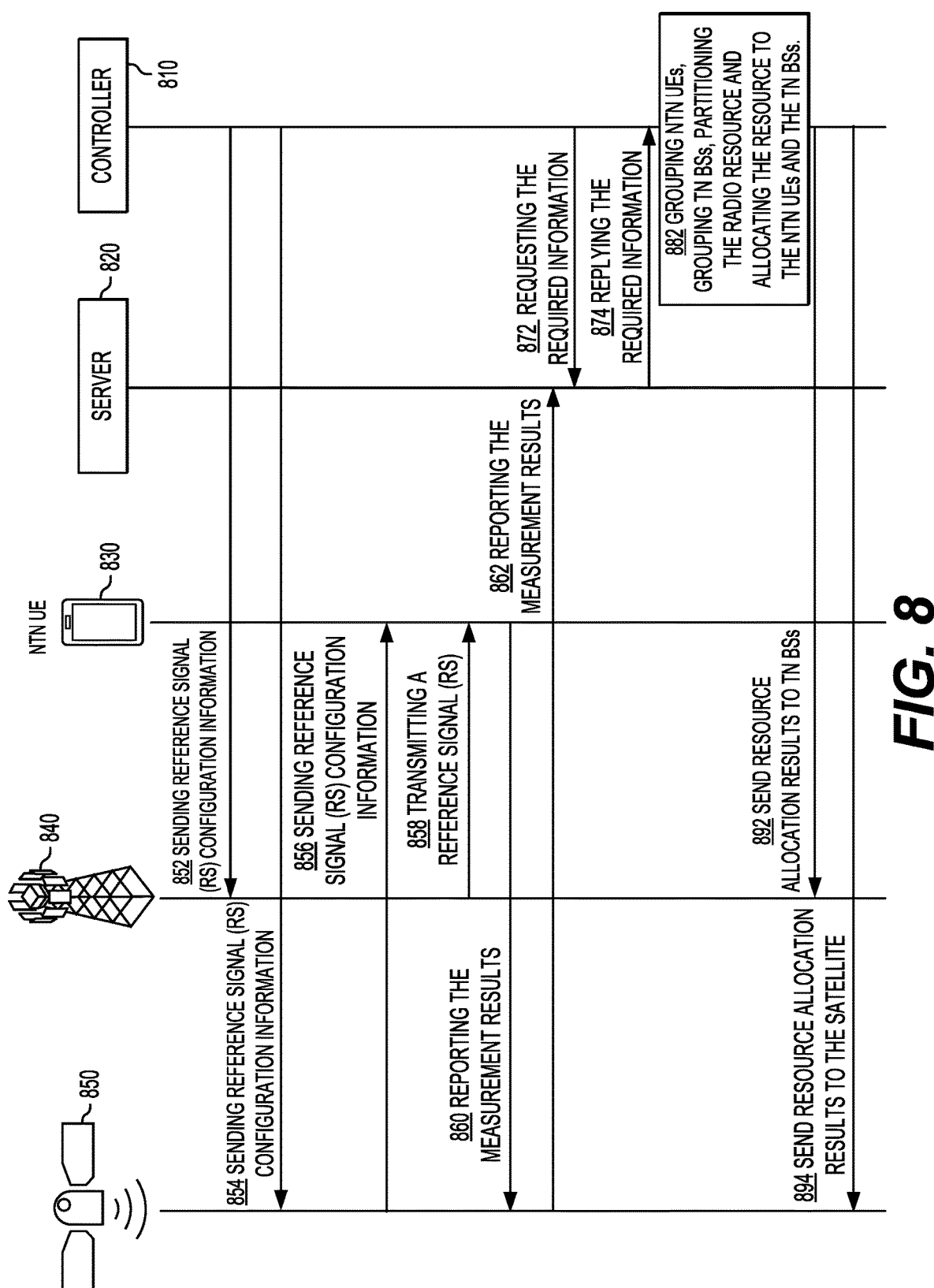
FIG. 8 shows a signal flow chart depicting the interaction between the resource allocation apparatus (represented as a separated server and a controller), the satellite, the TN BS, and the NTN UE, in accordance with embodiments of the disclosure.

FIG. 8 shows a signal flow chart depicting the interaction between the resource allocation apparatus, the satellite, an exemplary TN BS, and an exemplary NTN UE, in accordance with embodiments of the disclosure. Again, in the scenario shown in FIG. 8, a controller 810 and a server 820 collaborate to perform radio resource allocation. The server 820 is capable of acquiring the necessary information for resource allocation from the NTN UEs, the TN BSs, and/or the satellite. The controller 810 can use the information collected by the server 810 to decide how to allocate the radio resources. While FIG. 8 only shows one NTN UE 830 and one TN BS 840, there can be a plurality of NTN UEs and a plurality of TN BSs in practice.

At 852 and 854, the controller 810 can send reference signal (RS) configuration information to the TN BS 840 and the satellite 850. The satellite 850 can forward the received RS configuration information at 856 to the NTN UE 830. The TN BS 840 can generate a reference signal based on the RS configuration information, and sends it at 858 to the NTN UE 830. The NTN UE 830 can measure the reference signal based on the RS configuration information and report the measurement results at 860 to the satellite 850. At 862, the satellite 850 can send the measurement results received from the NTN UE 830, together with a measured satellite reference signal at the NTN UE 830 (or a measured NTN UE reference signal at the satellite 850), to the server 820.

At 872, the controller 810 can request the required information from the server 820 by sending a request message. At 874, the server 820 can respond to the controller 810 by sending a response message carrying the required information. In the embodiment shown in FIG. 8, the controller 810 obtains all the necessary information for conducting the radio resource allocation from the server 820. One skilled in the art can conceive that certain portions of the required information can be obtained from alternative sources, for example, the satellite 850.

At 882, the controller 810 can decide how to allocate the radio resources by grouping the NTN UEs, partitioning the radio resources, grouping the TN BSs, and assigning the radio resources between the NTN UEs and TN BSs. At 892 and 894, the controller 810 can transmit the resource allocation results to the TN BS 840 and the satellite 850 for implementation.

Figure 9:
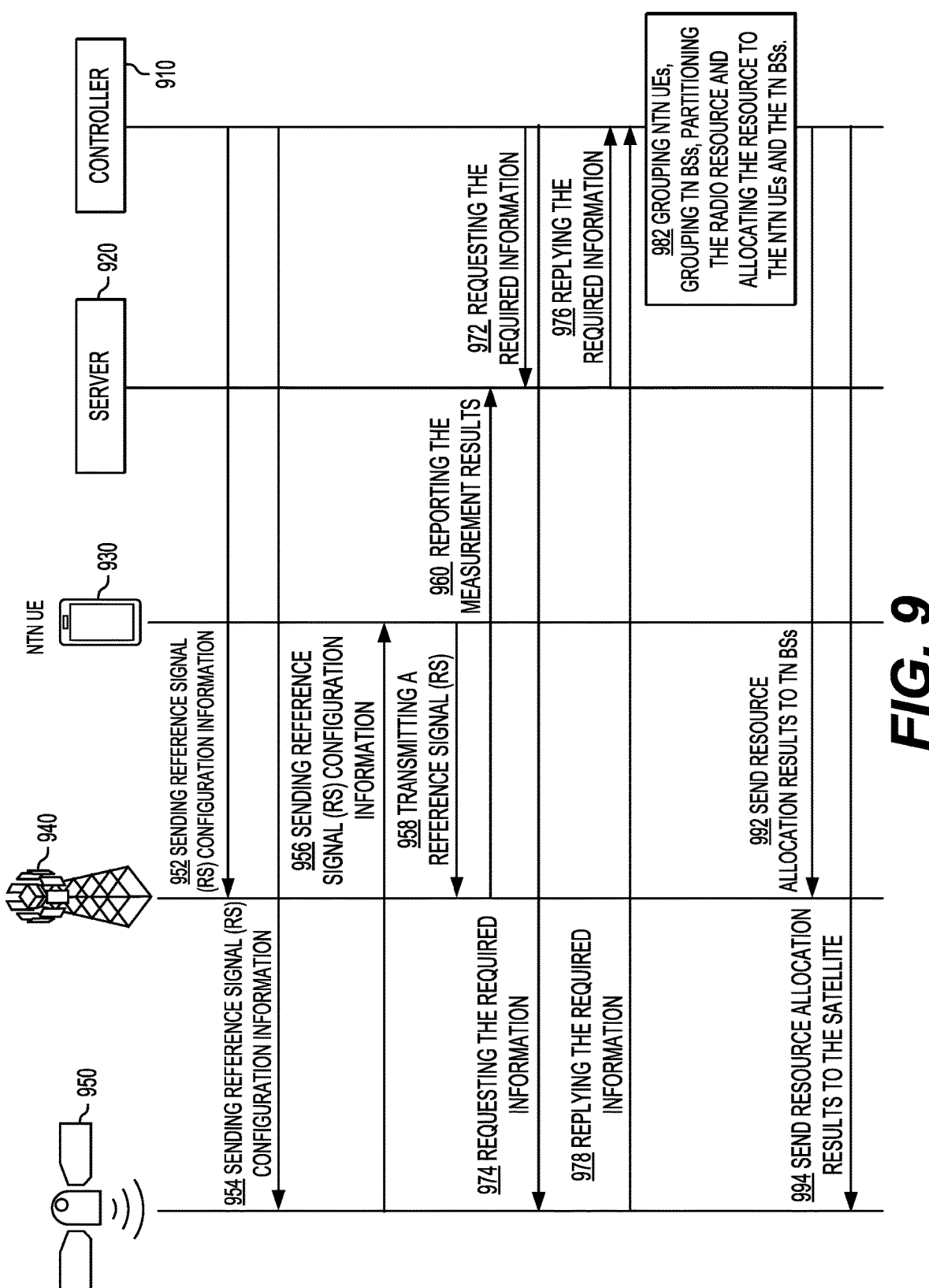
FIG. 9 shows a signal flow chart depicting the interaction between the resource allocation apparatus (represented as a separated server and a controller), the satellite, the TN BS, and the NTN UE, in accordance with embodiments of the disclosure.

FIG. 9 shows a signal flow chart depicting the interaction between the resource allocation apparatus, the satellite, an exemplary TN BS, and an exemplary NTN UE, in accordance with embodiments of the disclosure. Again, in the scenario shown in FIG. 9, a controller 910 and a server 920 collaborate to perform radio resource allocation. The server 920 is capable of acquiring the necessary information for resource allocation from the NTN UEs, the TN BSs, and/or the satellite. The controller 910 can use the information collected by the server 920 and information provided by the satellite 950 to decide how to allocate the radio resources. While FIG. 9 only shows one NTN UE 930 and one TN BS 940, there can be a plurality of NTN UEs and a plurality of TN BSs in practice.

At 952 and 954, the controller 910 can send reference signal (RS) configuration information to the TN BS 940 and the satellite 950. The satellite 950 can forward the received RS configuration information at 956 to the NTN UE 930. The NTN UE 930 can generate a reference signal based on the RS configuration information, and sends it at 958 to the TN BS 940. The TN BS 940 can measure the reference signal based on the RS configuration information and report the measurement results at 960 to the server 920.

At 972 and 974, the controller 910 can request the required information from the server 920 and the satellite 950 by sending request messages. At 976 and 978, the server 920 and the satellite 950 can respond to the controller 910 by sending response messages carrying the required information. For example, the information sent at 976 can be the NTN UE reference signal measured at the NT BS 940, while the information sent at 978 can be the received RSRP at the satellite 950 from the NTN UE 930.

At 982, the controller 910 can decide how to allocate the radio resources by grouping the NTN UEs, partitioning the radio resources, grouping the TN BSs, and assigning the radio resources between the NTN UEs and TN BSs. At 992 and 994, the controller 910 can transmit the resource allocation results to the TN BS 940 and the satellite 950 for implementation.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for performing radio resource allocation in a terrestrial network (TN) and non-terrestrial network (NTN) mixed system, the mixed system including a satellite that covers at least one NTN cell, and a plurality of TN base stations (TN BSs) within a coverage of the satellite, the NTN cell serving a plurality of NTN user equipments (NTN UEs), each of the plurality of TN BSs serving a plurality of TN user equipments (TN UEs), the method comprising:

dividing the plurality of NTN UEs into X NTN UE groups;

partitioning a radio resource into M parts, where $M \geq X$;

dividing the plurality of TN BSs into M TN BS groups;

deciding radio resource allocation regarding the plurality of NTN UEs, by allocating an i-th part of the radio resource to an i-th NTN UE group, where i=1, 2, . . . , X; and deciding radio resource allocation regarding the plurality of TN BSs, by allocating a sum of a j-th to an M-th parts of the radio resource to a j-th TN BS group, where j=1, 2, . . . , M.

2. The method of claim 1, further comprising:

informing the satellite of the radio resource allocation regarding the plurality of NTN UEs; and informing the plurality of TN BSs of the radio resource allocation regarding the plurality of TN BSs.

3. The method of claim 1, further comprising:

acquiring, from the satellite, the plurality of TN BSs, and/or the plurality of NTN UEs, information used for deciding the radio resource allocation regarding the plurality of NTN UEs and information for deciding the radio resource allocation regarding the plurality of TN BSs; and obtaining a first set of thresholds used for NTN UE grouping and a second set of thresholds used for TN BS grouping, wherein the NTN UE group dividing step further comprises dividing, based on the acquired information used for deciding the radio resource allocation regarding the plurality of NTN UEs and the obtained first set of thresholds, the plurality of NTN UEs into the X NTN UE groups, and the TN BS group dividing step further comprises dividing, based on the acquired information for deciding the radio resource allocation regarding the plurality of TN BSs and the obtained second set of thresholds, the plurality of TN BSs into the M TN BS groups.

4. The method of claim 3, wherein the information used for deciding the radio resource allocation regarding the plurality of NTN UEs includes:

a power level of a reference signal received at the satellite from each of the plurality of NTN UEs, or a power level of a reference signal received at each of the plurality of NTN UEs from the satellite.

5. The method of claim 3, wherein the information for deciding the radio resource allocation regarding the plurality of TN BSs includes:

a coupling loss between each of the plurality of TN BSs and the satellite, or a coupling loss between each of the plurality of TN BSs and the plurality of NTN UEs.

6. The method of claim 5, wherein the coupling loss between each of the plurality of TN BSs and the satellite is determined based on:

a power level of a reference signal received at the TN BS from the satellite, or a power level of a reference signal received at the satellite from the TN BS.

7. The method of claim 5, wherein the coupling loss between each of the plurality of TN BSs and the plurality of NTN UEs is determined based on:

a power level of a reference signal received at the TN BS from the plurality of NTN UEs, or a power level of a reference signal received at the plurality of NTN UEs from the TN BS.

8. The method of claim 5, wherein the coupling loss between each of the plurality of TN BSs and the plurality of NTN UEs includes:

a coupling loss between the TN BS and an NTN UE that is selected from the plurality of NTN UEs based on a predefined criterion, an average coupling loss between the TN BS and the plurality of NTN UEs, a maximum coupling loss between the TN BS and the plurality of NTN UEs, or a median coupling loss between the TN BS and the plurality of NTN UEs.

9. The method of claim 3, wherein the first set of thresholds used for NTN UE grouping and the second set of thresholds used for TN BS grouping are predefined for the mixed system.

10. The method of claim 3, wherein the first set of thresholds used for NTN UE grouping and the second set of thresholds used for TN BS grouping are determined based on an objective function.

11. The method of claim 10, where in the objective function is constructed based on:

a product of a sum of throughput of all TN BSs in the M TN BS groups and a sum of throughput of all NTN UEs in the X NTN UE groups, a weighted sum of the sum of throughput of all TN BSs in the M TN BS groups and the sum of throughput of all NTN UEs in the X NTN UE groups, a product of a sum of an obtained bandwidth of all TN BSs in the M TN BS groups and a sum of an obtained bandwidth of all NTN UEs in the X NTN UE groups, or a weighted sum of the sum of the obtained bandwidth of all TN BSs in the M TN BS groups and the sum of the obtained bandwidth of all NTN UEs in the X NTN UE groups.

12. The method of claim 1, wherein the partitioning step further comprises:

partitioning the radio resource in a frequency domain, a time domain, and/or a polarization direction.

13. The method of claim 1, wherein the partitioning step further comprises:

determining the M-th part, $W_M$, of the radio resource denoted by W, and for i=1, 2, . . . , X, determining the i-th part, denoted by $W_i$, of the radio resource W, based on $W_i=(W-W_M)$ $*|N_i|/(\mathrm{sum}(|N_1|, |N_2|, \ldots, |N_X|))$, where $|N_i|$ denotes a number of all NTN UEs within the i-th NTN UE group $N_i$.

14. The method of claim 13, wherein the step of deciding the radio resource allocation regarding the plurality of NTN UEs further comprises:

for i=1, 2, . . . , X, allocating the i-th part $W_i$ to the NTN UEs within the NTN UE group $N_i$, such that each NTN UE within the NTN UE group $N_i$ is assigned a portion of the radio resource determined by $W_i/|N_i|$.

15. The method of claim 1, wherein the partitioning step further comprises:

for i=1, 2, . . . , X, determining a unit resource, $bw_i$, of the i-th NTN UE group, for i=1, 2, . . . , X, determining the i-th part, $W_i$, of the radio resource based on $W_i=|N_i|*bw_i$, where $|N_i|$ denotes a number of all NTN UEs within the i-th NTN UE group $N_i$, and determining the M-th part, $W_M$, of the radio resource based on $W_M=W-\mathrm{sum}(W_1, W_2, \ldots, W_X)$.

16. The method of claim 15, wherein the step of deciding the radio resource allocation regarding the plurality of NTN UEs further comprises:

for i=1, 2, . . . , X, allocating the i-th part $W_i$ to the NTN UEs within the NTN UE group $N_i$, such that each NTN UE within the NTN UE group $N_i$ is assigned a portion of the radio resource determined by $bw_i$.

17. The method of claim 1, further comprising:

sending reference signal configuration information to the satellite and the plurality of TN BSs, the reference signal configuration information including information regarding how a reference signal used for acquiring the information used for deciding the radio resource allocation regarding the plurality of NTN UEs or a reference signal used for acquiring the information for deciding the radio resource allocation regarding the plurality of TN BSs is to be transmitted.

18. The method of claim 1, wherein a coverage of the NTN cell is determined based on whether a reference signal received power (RSRP) or a reference signal received quality (RSRQ) in the NTN cell is above a predefined threshold.

19. An apparatus for performing radio resource allocation in a terrestrial network (TN) and non-terrestrial network (NTN) mixed system, the mixed system including a satellite that covers at least one NTN cell, and a plurality of TN base stations (TN BSs) within a coverage of the satellite, the NTN cell serving a plurality of NTN user equipments (NTN UEs), each of the plurality of TN BSs serving a plurality of TN user equipments (TN UEs), the apparatus comprising circuitry configured to:

divide the plurality of NTN UEs into X NTN UE groups;

partition a radio resource into M parts, where M>X;

divide the plurality of TN BSs into M TN BS groups;

decide radio resource allocation regarding the plurality of NTN UEs, by allocating an i-th part of the radio resource to an i-th NTN UE group, where i=1, 2, . . . , X; and decide radio resource allocation regarding the plurality of TN BSs, by allocating a sum of a j-th to an M-th parts of the radio resource to a j-th TN BS group, where j=1, 2, . . . , M.

20. A non-transitory computer readable medium including computer readable instructions, which when executed by at least one processor, cause the at least one processor to perform a method for performing radio resource allocation in a terrestrial network (TN) and non-terrestrial network (NTN) mixed system, the mixed system including a satellite that covers at least one NTN cell, and a plurality of TN base stations (TN BSs) within a coverage of the satellite, the NTN cell serving a plurality of NTN user equipments (NTN UEs), each of the plurality of TN BSs serving a plurality of TN user equipments (TN UEs), the method comprising:

dividing the plurality of NTN UEs into X NTN UE groups;

partitioning a radio resource into M parts, where M>X;

dividing the plurality of TN BSs into M TN BS groups;

deciding radio resource allocation regarding the plurality of NTN UEs, by allocating an i-th part of the radio resource to an i-th NTN UE group, where i=1, 2, . . . , X; and deciding radio resource allocation regarding the plurality of TN BSs, by allocating a sum of a j-th to an M-th parts of the radio resource to a j-th TN BS group, where j=1, 2, . . . , M.

* * * * *